(No Model.)

C. F. DAVY.
TILTING SPRING SEAT.

No. 557,494. Patented Mar. 31, 1896.

WITNESSES.
Paul Johot
J. B. Caplinger

INVENTOR
C. F. Davy
BY
Munn & Co
ATTORNEYS.

UNITED STATES PATENT OFFICE.

CHARLES F. DAVY, OF STARKVILLE, NEW YORK.

TILTING SPRING-SEAT.

SPECIFICATION forming part of Letters Patent No. 557,494, dated March 31, 1896.

Application filed September 19, 1895. Serial No. 562,927. (No model.)

*To all whom it may concern:*

Be it known that I, CHARLES F. DAVY, of Starkville, in the county of Herkimer and State of New York, have invented a certain new and Improved Spring-Seat, of which the following is a full, clear, and exact description.

This invention relates to certain improvements in vehicle-seats, and has for its object, in part, to provide a spring-seat of a novel and inexpensive construction adapted for use on vehicles of various kinds—as, for example, agricultural machines, locomotives, and the like—the seat being adapted, when mounted on an agricultural machine, to be used in connection with means whereby it may be adjusted in a simple and convenient manner so as to stand at any angle to the surface over which the machine is being driven. In this way the seat is made perfectly comfortable at all times, and is caused to stand in a horizontal position even when the machine whereon it is arranged is being driven over a side hill.

The invention consists principally in a seat supported on springs from a frame adapted to be bolted to the seat-post of the vehicle, and having at its sides studs from which extend upwardly and oppositely inclined side springs, so that the seat, while capable of moving in all directions, is still held in position by said springs.

The invention also contemplates certain novel features of the construction, combination, and arrangement of the various parts of the seat, whereby certain important advantages are attained, and the device is made simpler, cheaper, and otherwise better adapted and more convenient for use than various other devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the figures.

Figure 1:
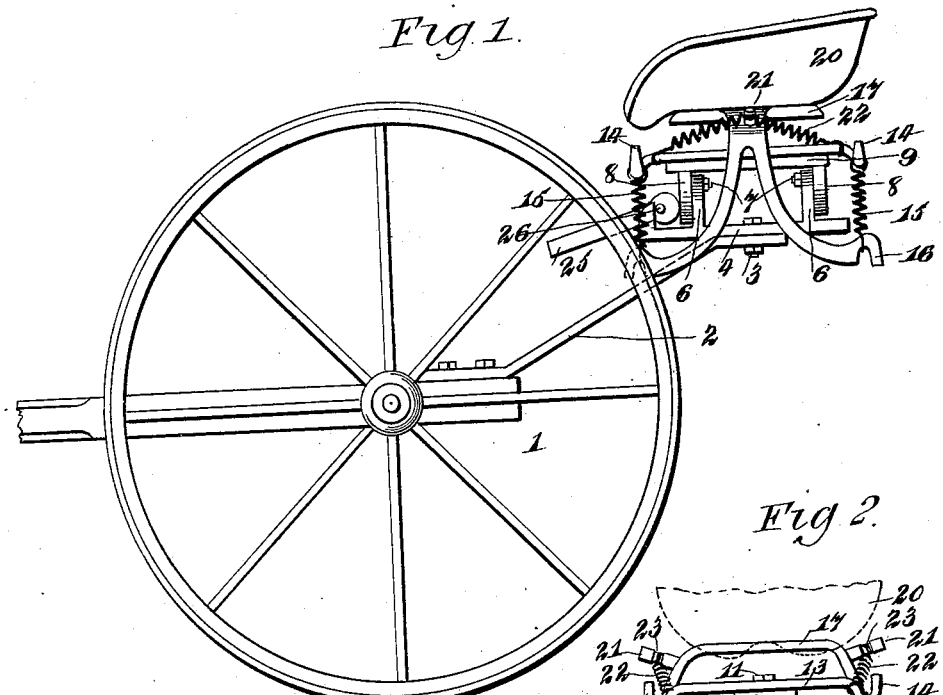
Figure 2:
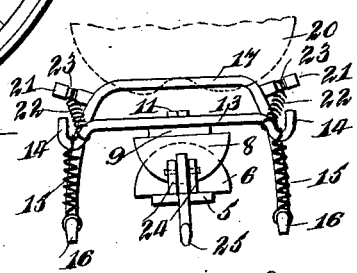
Figure 4:
Figure 3:
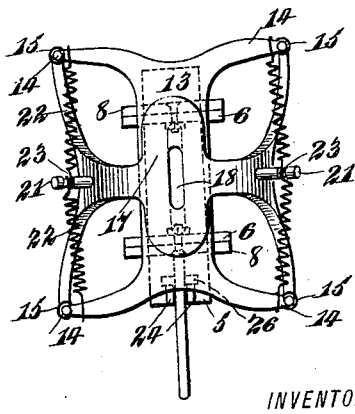

Figure 1 is a side view showing an agricultural machine provided with a seat constructed in accordance with my invention, and Fig. 2 is an end view of the seat-support detached. Fig. 3 is a plan view of the same, and Fig. 4 is a vertical longitudinal section taken through the seat-support constructed according to my invention.

In the views, 1 indicates the vehicle to which the seat is applied, having a seat-standard 2 of the usual or any kind, to which my improved seat may be attached by means of a bolt 3 passing through a slot formed on said standard and also through a slot 5 in the lower section 4 of the tilting support, which is provided at opposite ends with upturned brackets or lugs 6, to the upper parts of which are pivoted on alined bolts 7 the depending lugs or brackets 8 of the upper section 9 of said tilting support.

The upper section 9 of the tilting support is provided with a slot 10 engaged by a bolt 11, also passing through a slot 12 in the lower section 13 of the spring-seat support or frame, which extends, as shown in the drawings, longitudinally of the vehicle, being provided at its front and rear ends with oppositely-directed arms 14, having hooks at their outer ends, to which are attached the upper ends of coil-springs 15 of suitable strength.

17 represents the upper section of the spring-seat support or frame, which extends transversely of the device, or substantially at right angles to the section 13, and is provided with arms extending forward and back from its opposite ends and provided with depending ends provided with hooks 16 to engage the lower ends of the springs 15, as clearly seen in the drawings. The section 17 is slotted at its central portion, as seen at 18 in the drawings, to receive a bolt 19 on the seat 20, whereby said seat may be secured in place, and at its opposite ends said section 17 is provided with projecting lugs or pins 21, the outer ends of which are inclined upward and grooved, as seen at 23, to receive the looped ends of diagonal side springs 22, the ends of which extend forward and back and downward and are connected to the hooked arms 14 of the lower section 13 of the spring support or frame.

The lower section 5 of the tilting frame is provided at its forward part with two lugs 24, spaced apart to receive between them a lever or operating-handle 25, having a pin 26 arranged to bear against the rear sides of said lugs or that side nearest the forward bracket 8, and the said pin forms a pivot whereon said lever swings, the rear end of the lever being formed into an eccentric arranged to engage said flange when said lever is operated, so as to lock the two sections of the tilting frame together.

In operation, when the seat constructed according to my invention is attached to an agricultural machine, as shown in the drawings, the seat may be adjusted laterally to stand at any desired angle to the surface over which the machine is being driven. For example, when the machine is being driven along a side hill, so that were the seat fixed it would stand in an inclined position and afford a very uncomfortable and insecure support for the operator, the lever 25 is manipulated to disengage the upper section of the tilting frame, after which the user allows his weight to press on the higher side of the seat, causing said seat to again assume a horizontal position, whereupon the handle or lever 25 is again operated to lock the sections of the tilting frame together.

The device constructed as above described is exceedingly simple, durable, and inexpensive in its nature, and affords a very comfortable seat for all varieties of vehicles, since the springs are so arranged that it may move against the tension of the springs in all directions. Furthermore, the side springs 22 serve to prevent rocking movement of the seat and hold the same moderately steady.

It will be obvious from the above description of my invention that the device is susceptible of some modification without material departure from the principles and spirit of my invention, and for this reason I do not wish to be understood as limiting myself to the exact form of the device herein set forth.

Having thus described my invention, I claim as new and desire to secure by Letters Patent—

1. The combination of an upper frame-section, a lower frame-section, springs secured at their upper ends to the lower section and at their lower ends to the upper section and serving as supports for the upper section, and side springs extending diagonally from the central portion of one section to the ends of the other section, substantially as set forth.

2. The combination of a lower frame-section having oppositely-diverging arms at opposite ends, an upper frame-section also having oppositely-diverging arms at opposite ends, said sections having their arms arranged at right angles to each other, and the arms of the upper section being arranged to depend below the arms of the lower section, springs uniting said arms of the respective sections, and side springs, each connected at one end at or near the center of one section and having its opposite end extending diagonally to one arm of the other section, substantially as set forth.

CHARLES F. DAVY.

Witnesses:
C. L. PETREE,
WILLIAM H. DAVY.